United States Patent [19]

Wiles

[11] 4,381,457
[45] Apr. 26, 1983

[54] METHOD AND APPARATUS FOR PREVENTING LOSS OF DATA FROM VOLATILE MEMORY

[75] Inventor: James P. Wiles, Olean, N.Y.

[73] Assignee: Ladco Development Co., Inc., Olean, N.Y.

[21] Appl. No.: 286,278

[22] Filed: Apr. 23, 1981

[51] Int. Cl.³ .............................................. H02J 9/00
[52] U.S. Cl. .................................................. 307/64
[58] Field of Search .............................. 307/64, 66, 67

[56] References Cited

U.S. PATENT DOCUMENTS

| | | | |
|---|---|---|---|
| 3,229,111 | 1/1966 | Schumacher et al. | 307/66 X |
| 3,609,386 | 9/1971 | Patlach | 307/66 |
| 3,614,461 | 10/1971 | Speer et al. | 307/64 |
| 3,683,198 | 8/1972 | Thode | 307/66 |
| 3,974,660 | 8/1976 | Farr | 307/66 X |
| 3,999,078 | 12/1976 | Udvardi-Lakos | 307/66 |
| 4,122,359 | 10/1978 | Breikss | 307/64 |
| 4,143,283 | 3/1979 | Graf et al. | 307/66 |
| 4,181,842 | 1/1980 | Elias et al. | 307/66 |
| 4,315,162 | 2/1982 | Ferguson | 307/66 |

FOREIGN PATENT DOCUMENTS

| | | | |
|---|---|---|---|
| 2636573 | 2/1978 | Fed. Rep. of Germany | 307/66 |
| 1377368 | 12/1974 | United Kingdom | 307/64 |

Primary Examiner—Donald A. Griffin
Attorney, Agent, or Firm—Fidelman, Wolffe & Waldron

[57] ABSTRACT

Normal line voltage, such as 115 volts AC available on a standard home or office receptacle (or single or three phase 230 volts AC), is surge protected and filtered prior to monitoring for voltage deviations outside of a voltage "window" such as 105–125 volts AC. Deviations outside of this voltage "window", are sensed and a deviation output signal is generated. The filtered AC supply and an auxiliary AC supply are selectively connected to the user equipment through a power distribution panel, with the selection being determined by the deviation output signal. By the method and apparatus of the invention, the computer equipment is supplied with primary input power from the utility company or the like as long as the voltage remains within this adjustable voltage window of 105–125 volts AC. If the line voltage moves outside of this "window", due to drift, brown-out, drop-out (complete voltage failure), or a surge creating an overvoltage condition, there is a transference of the power supplied to the computer equipment from the normal AC supply to an auxiliary AC supply to maintain the contents of RAM and allow the program to continue running. Visual and audible indicators are actuated upon the occurrence of the deviation output signal to notify the user of the equipment that primary power has been disconnected and data should be transferred from volatile memory to non-volatile memory to prevent data loss. If the failure is temporary, the device automatically recovers and switches back to primary AC power when the filtered line voltage is within its "window".

6 Claims, 3 Drawing Figures

METHOD AND APPARATUS FOR PREVENTING LOSS OF DATA FROM VOLATILE MEMORY

CROSS-REFERENCES TO PRIOR ART

U.S. Pat. No. 3,229,111-Schumacher, et al., "A.C. Power System Having Alternate Sources of Supply"

U.S. Pat. No. 3,614,461-Speer, "Circuit for Keeping the Frequency of an Inverter Synchronized with the Frequency of Another Source"

U.S. Pat. No. 3,683,198-Thode, "Load Monitored Standby Power System"

U.S. Pat. No. 3,974,660-Farr, "Power Supply for Refrigeration Units"

U.S. Pat. No. 3,999,078-Udvardi-Lakos, "Interruption Free Inverter Power Supply"

BACKGROUND OF THE INVENTION

All users of micro-computers at one time or another have experienced unexplained program failures that occur at seemingly random intervals and then disappear, only to reappear at a later date. These program failures or "glitches" defy explanation as to their cause. Upon RESET, the program performs properly, memory checks out, and power supply voltages appear normal. In short, the program has failed for no obvious reason. Additionally, while going through a program at the terminal, entering data or processing some report, or working on a new program development, the screen may go blank suddenly, with the subsequent loss of all data and programs resident in volatile memory. The problems of the above two situations are similar, with the main difference being the duration and amount of voltage disturbance. In the first situation, a voltage disturbance of very short duration, with rapid recovery to its normal range, has probably occurred. These line disturbances may vary from micro-seconds to milli-seconds which, in any case, are so brief as to be indiscernible to the computer operator. These short-duration voltage disturbances may be due to voltage transients created by power line switching equipment or nearby high frequency "noise" generating equipment such as the motors of small appliances or hand tools, arc-producing equipment such as fluorescent lights, or switching-type computer DC power supplies. In the second situation, the primary power failure of longer duration has occurred due to an electrical storm, downed distribution line, or power equipment malfunction.

Digital computers contain information storage devices called random access memories (RAMs) which retain or store computer programs and data being currently processed in the computer. The RAM is capable of storing or retaining data in the form of binary numbers (1's or 0's) only as long as the applied voltage is present to the device within prescribed limits. If the line voltage fails due to a power system fault such as a lightning strike or a downed distribution line, or if the voltage moves above or below design limits due to power system "brown-outs", radio frequency interference, or electromagnetic interference, the information stored in these RAM devices may be partially or completely altered or lost. Even the best of equipment designs cannot ensure program integrity when components become marginal due to parameter drifts and aging. The alteration of only one bit or one cell of a memory chip may ruin a program. Maintaining the input voltage to the equipment within the designed limits helps to alleviate these voltage-induced failures.

Large computer installations have been equipped with standby, uninterruptable power sources that substitute for primary line power in the event of failure. These have generally been in the form of a diesel generator with complex associated voltage sensing and switching equipment. The expense of this equipment precludes its use for mini- and micro-computers such as desk-top computers for the home or office.

Regarding the cross-referenced prior art listed above, the following remarks are in order: U.S. Pat. No. 3,999,078 describes a means for controlling a standby power supply (battery/inverter) to make it more energy efficient. The inverter is switched "in" only on collapse of the network supply voltage, and a voltage regulator is required. U.S. Pat. No. 3,614,461 discloses the use of a synchronizer and back-up power source; frequency synchronization is based upon a phase related error signal. U.S. Pat. No. 3,683,198 discloses a standby power system in which standby power is turned on only upon demand from the load and when there is a main supply line voltage drop-out. U.S. Pat. No. 3,229,111 discloses an AC power system having alternate sources of supply which switches to standby power upon the occurrence of a voltage drop-out or reduced voltage, but not upon the occurrence of an overvoltage. U.S. Pat. No. 3,974,660 discloses a standby power supply system which is too slow for protection of semi-conductor memories.

Accordingly, it is an object of the present invention to provide a portable memory protection system for desk-top, home, or office computers which is both affordable and reliable and which will indicate to the user of equipment when a power problem has occurred and will allow the operator to transfer data from volatile to non-volatile memory in time to prevent loss of the data.

It is another object of the invention to provide a memory protection system which may be easily connected between the primary power source and the equipment by an untrained user.

It is an additional object of the invention to provide a memory protection system which may be interlocked to the user equipment such that the transfer of data between volatile and non-volatile memory may take place automatically, according to an executive interrupt program scan whereby no loss of data will occur.

It is a further object of this invention to provide a method and apparatus for preventing loss of data from volatile memory due to voltage surges, drop-outs, undetectable high frequency voltage disturbances, and failure of marginal components because of power problems.

It is still another object of this invention to provide a method and apparatus for preventing loss of data from volatile memory which requires no voltage regulator or line synchronizer while, in effect, providing a regulated and dedicated line.

BRIEF SUMMARY OF THE INVENTION

Normal line voltage, such as 115 volts AC available on a standard home or office receptacle (or single or three phase 230 volts AC), is surge protected and filtered prior to monitoring for voltage deviations outside of a voltage "window" such as 105–125 volts AC. Deviations outside of this voltage "window", are sensed and a deviation output signal is generated. The filtered AC supply and an auxiliary AC supply are selectively connected to the user equipment through a power distribution panel, with the selection being determined by the deviation output signal. By the method and apparatus of the invention, the computer equipment is supplied with primary input power from the utility company or the like as long as the voltage remains within this typical voltage window of 105–125 volts AC. If the line voltage moves outside of this "window", due to drift, brown-out, drop-out (complete voltage failure), or a surge creating an overvoltage condition, there is a transference of the power supplied to the computer equipment from the normal AC supply to an auxillary AC supply to maintain the contents of RAM and allow the program to continue running. Visual and audible indicators are actuated upon the occurrence of the deviation output signal to notify the user of the equipment that primary power has been disconnected and data should be transferred from volatile memory to non-volatile memory to prevent data loss. If the failure is temporary, the device automatically recovers and switches back to primary AC power when the filtered line voltage is within its "window". The auxillary AC power supply provides power for a period up to ten minutes, depending upon the capacity of a battery/inverter and the load. This amount of time is sufficient to permit the saving of RAM data by transferring it onto permanent storage such as floppy disc or tape.

An alternate embodiment of the invention includes a customer interlock which may be connected to the user equipment and continually scanned, as by an executive interrupt program, for automatic transfer of data between volatile and non-volatile memory according to the presence or absence of the deviation output signal.

The auxiliary AC supply may be provided by a battery-supplied inverter, in which case, a battery charger is attached to the AC supply to charge the battery when there is no deviation output signal. Upon the occurrence of a deviation output signal, the battery charger is disconnected from the battery and an alarm is actuated.

An embodiment of the invention will now be described in detail with reference to the accompanying drawings, in which.

DETAILED DESCRIPTION OF THE DRAWINGS

Figure 1:
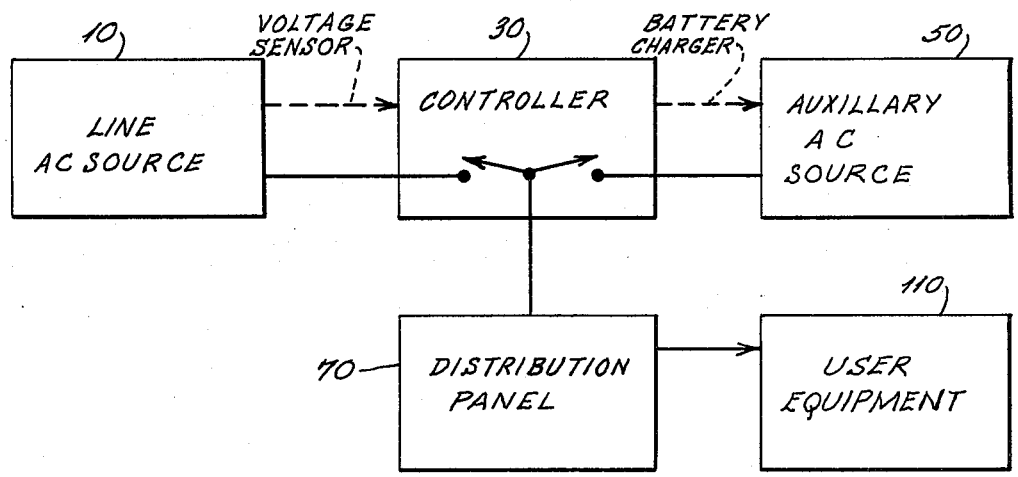
FIG. 1 is a circuit diagram in block form for depicting a method and apparatus of the invention.

With reference to FIG. 1, primary power such as standard building supply line 10 of 115 volts AC, and standby AC power 50 such as from a battery/inverter or motor/alternator set, are selectively supplied to a distribution panel 70 by means of a controller 30. The controller 30 monitors the building power and senses deviations outside of a voltage "window". If there is a deviation outside of the voltage "window", the controller 30 automatically switches from the building power 10 to the standby power 50. If the standby power 50 is a battery/inverter, the controller 30 also charges the battery thereof while monitored voltage levels are acceptable. The battery charger is disconnected from the battery when these voltage levels are unacceptable. The distribution panel 70 may be connected remotely to the controller 30, as by a power cable, and provides plural grounded AC receptacles for attachment of the user equipment 110. Additionally, the controller 30 may comprise an interlock for connection to the user equipment 110 so that an executive interrupt program or the like may be used to transfer data between volatile and non-volatile memory according to which source of power, primary or secondary, is being supplied to the equipment through the distribution panel 70.

Figure 2:
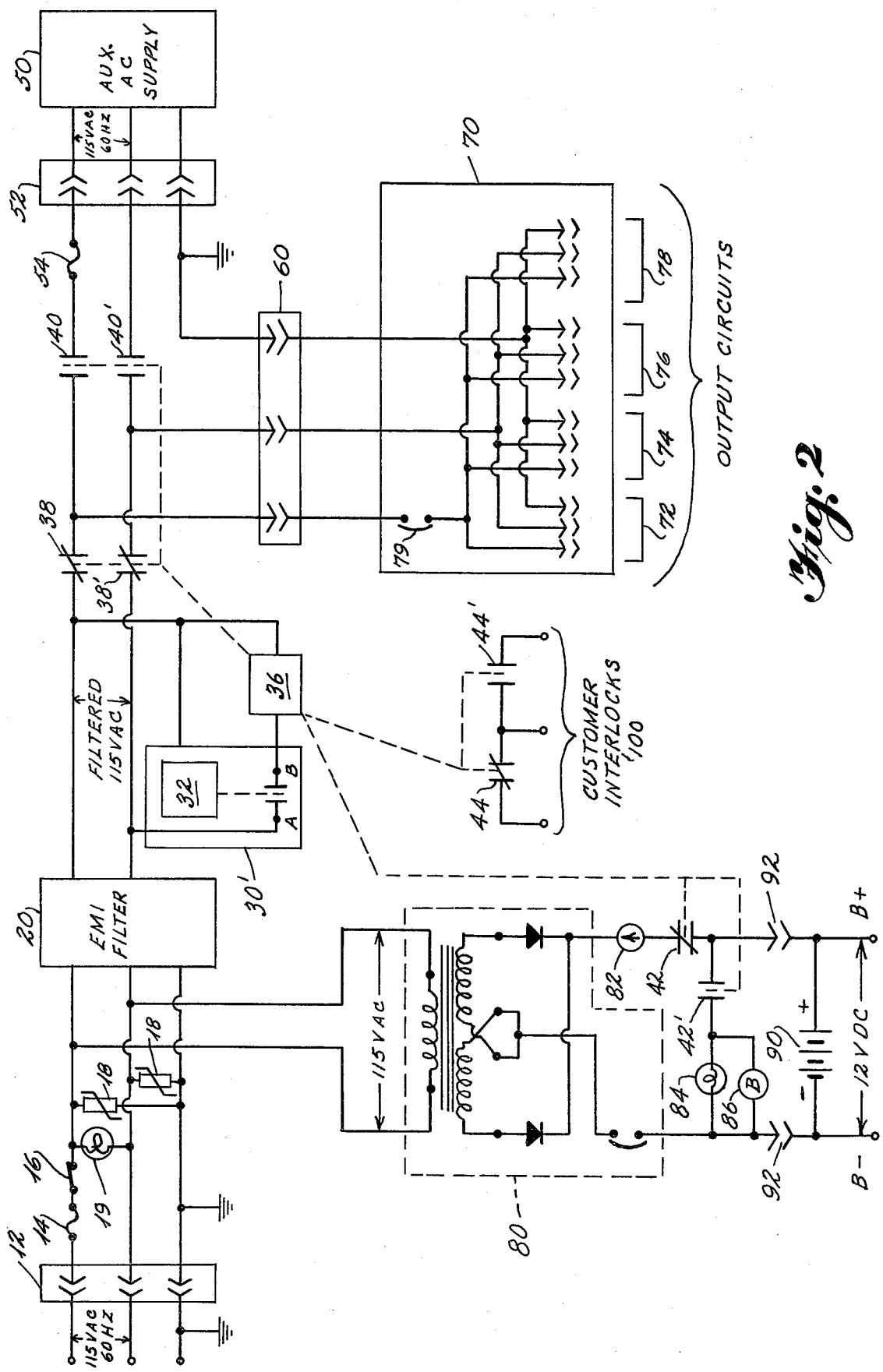
FIG. 2 is a schematic, partially in block form, for depicting the method and apparatus of the invention.

Referring to FIG. 2, input line voltage is supplied via grounded receptacle 12, fuse 14, and ON/OFF switch 16. Light 19 indicates that switch 16 is in the ON position and line voltage is received by the controller. Varistors 18 such as G.E. #V130LA10A protect the circuit from voltage surges. A filter 20, such as CORCOM Mod. #5R3, filters electromagnetic interference from the AC supply and supplies a filtered AC to voltage monitor 30'. Filter 20 filters common mode (both lines to ground) and differential mode (between hot and neutral lines) noise. Monitor 30' monitors the filtered AC supply and senses any deviations outside of a voltage "window" for control of AC power to the user's equipment. Auxiliary AC supply 50 is a battery/inverter combination in the preferred embodiment, such as an ordinary 12VDC car battery and 12VDC input, 115 AC output inverter, but may be another source of AC power such as a motor/alternator set. Auxiliary AC supply 50 is connected to the controller circuit by grounded receptable 52 and is fused at 54.

Automatic selection of the filtered AC supply voltage or the auxiliary AC supply voltage is provided by monitor 30'. High and low voltage "window" limits are adjustably set and, when the filtered AC supply voltage deviates outside of the voltage "window", a control relay 36 is actuated.

Monitor 30' includes a deviation output relay 32 which is energized as long as the filtered AC supply voltage is within the voltage "window". When the filtered AC supply voltage deviates outside of this "window", relay 32 is automatically denergized and contact 34 is closed to actuate control relay 36. When control relay 36 is actuated, contacts 38, 38' open to disconnect the filtered AC supply and contacts 40, 40' close to connect the auxiliary supply through a grounded receptable 60 to circuit breaker protected distribution panel 70. The distribution panel 70 may be located remotely from the controller housing and connected thereto through a grounded power cable by receptable 60. Alternatively, panel 70 may be incorporated in the controller housing. Panel 70 includes a circuit breaker 79 and grounded output receptacles 72, 74, 76, and 78 for easy connection of the user equipment, such as a desk-top computer and its associated electrical equipment.

When auxiliary AC supply 50 is a battery/inverter, the controller housing includes a standard battery charger 80 which is normally connected to the battery 90 of the battery/inverter combination as by alligator clips 92. The battery charger 80 includes a self-resetting circuit breaker to protect the charger circuits in case of overcurrents resulting from discharged batteries. Under normal line voltage conditions, battery 90 is in a charging state. With this arrangement, the auxiliary AC supply "floats" on the input line voltage through the battery charger when the filtered AC supply is within the voltage "window" so that there is no start-up time or equipment needed, and a meter 82 indicates that battery 90 is being charged. With battery charger 80 included in the control housing, control relay 36 includes contacts 42, 42' for disconnecting and isolating battery charger 80 from battery 90 and supplying power to the inverter upon a deviation of the filtered AC supply outside of the voltage "window", and connecting a visual indicator 84 and an audible indicator 86 across the battery charger to provide an alarm upon the switchover from filtered AC supply to auxiliary AC supply. An operator, upon seeing or hearing this alarm, may then transfer data from volatile memory to non-volatile memory to prevent loss thereof.

An additional feature of the invention includes a customer interlock 100 by which automatic transfer between volatile and non-volatile memory may be effected. By connecting customer interlock 100 to the user equipment, additional control relay contacts 44, 44' may be constantly scanned, as by an executive interrupt program in the user equipment, so that data may be transferred from volatile to non-volatile memory upon occurrence of a deviation of the filtered AC supply outside of the voltage "window". Since the user equipment is still totally functional, due to the auxiliary AC supply, the customer interlock 100 continues to be scanned, and automatic transfer back to volatile memory from non-volatile memory may be effected as soon as the filtered AC supply voltage returns within the limits of the voltage "window", as sensed by monitor 30'. The response time to the change in the average filtered AC supply voltage within the "window", is a maximum of 100 milliseconds. The response time to a line drop-out (over- or under-voltage) is 16-20 milliseconds. Accordingly, the circuit is sufficient to transfer power between the user equipment and the line or auxiliary supplies without loss of data.

FIG. 2 discloses closed and open contacts of control relay 36 when there is no deviation outside of the voltage window. Upon the occurrence of a deviation signal, the open contacts are closed and the closed contacts are opened.

Figure 3:
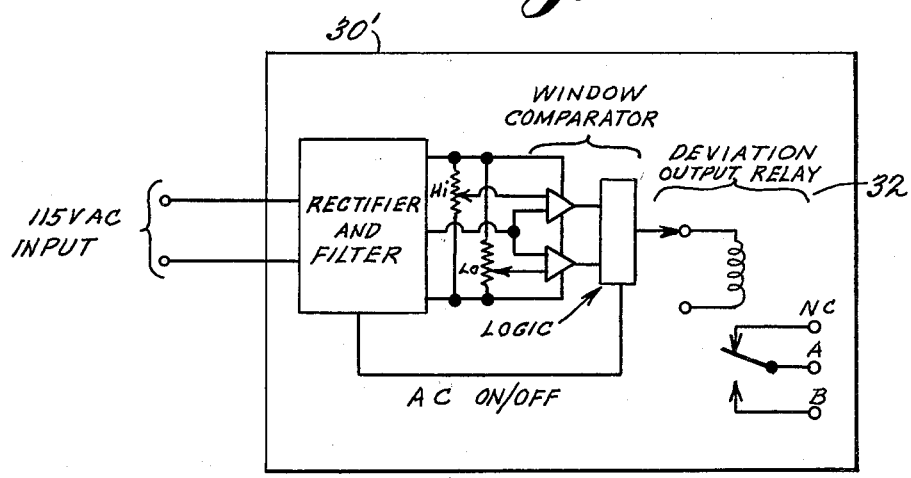
FIG. 3 is a schematic diagram of the monitor for the filtered AC supply.

With reference to FIG. 3, the monitor 30' includes a rectifier and filter which receives 115 volts AC input and rectifies it prior to comparison by the window comparitor, as shown. Potentiometers allow adjustable setting of the high and low limits of the voltage "window" to provide energization of relay 32.

A synchronizer is not needed because of the control relay isolation and because each piece of user equipment 110 derives DC from AC with enough primary and secondary transformer inductance to smooth out minor distortions of input power. A voltage regulator is not needed because of the window comparitor used in monitor 30'.

A prototype controller housing, without the separate plug-in distributor cable and panel, measured 11"×8"×7" and weighed approximately 16 pounds. This prototype included grounded receptacles for connection of the AC supply, auxiliary AC supply, and distributor power cable, as well as a battery charger and battery connection cables. Additionally, it included the fuses, varistors, power switch and indicator, filter, monitor, control relay, customer interlock, and power alarms and meter. Installation is simple and straightforward. By connecting the inverter input and the battery charger alligator clips to the battery output terminals, a controller housing plug labelled INVERTER to the inverter output receptable, a converter housing plug labelled LINE to the building power receptacle, and the computer equipment to the distribution panel and switching on the controller, the user equipment is protected from line voltage disturbances.

The objects set forth above, among those made apparent from the preceding description are efficiently attained and, since certain changes may be made in the carrying out the above method and apparatus without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. A method for preventing data loss from volatile memory of user equipment due to AC supply deviations by using an auxiliary AC supply, and comprising the steps of:
   providing a controller and power distributer separably attached between said AC supply, said user equipment, and said auxiliary AC supply;
   filtering said AC supply to provide a filtered AC supply;
   presetting adjustable upper and lower limits of a voltage window;
   monitoring said filtered AC supply for voltage deviations outside of said voltage window;
   sensing a deviation outside of said voltage window and providing a deviation output signal in response thereto;
   actuating a control switch in response to said deviation output signal;
   disconnecting said filtered AC supply from said distributor and connecting said auxiliary AC supply to said distributor by said control switch in response to said deviation output signal;
   disconnecting said auxiliary AC supply from said distributor and connecting said AC supply to said distributor by said control switch upon cessation of said deviation output signal; and
   indicating to an operator of said equipment the disconnection of said AC supply whereby said operator may transfer said data from volatile to non-volatile memory.

2. A method as in claim 1, and further comprising the step of:
   providing a user equipment interlock;
   signalling said user equipment of the presence or absence of a deviation output signal via said interlock; and
   transferring data between said volatile memory and said non-volatile memory automatically as by an executive interrupt program according to the presence or absence of said deviation output signal.

3. A method as in claim 1, wherein said auxiliary AC supply is a battery supplied inverter which outputs said auxiliary AC supply and wherein said controller further comprises a battery charger connected between said AC supply and said battery, and further comprising the steps of:
   floating said auxiliary AC supply on said AC supply via said battery charger;
   disconnecting said battery charger from said battery by said control switch in response to said deviation output signal;
   connecting a light and buzzer in parallel with said battery by said control switch and visually and audibly indicating disconnection of said battery charger from said battery; and reconnecting said battery charger to said battery and disconnecting said light and buzzer by said control switch upon cessation of said deviation output signal.

4. In an apparatus for preventing loss of data from volatile memory of user equipment, the improvement comprising:

a portable housing attachable between an AC supply and said user equipment and having control means for receiving said AC supply and controlling power to said user equipment;

means for separably attaching and supplying auxiliary AC supply to said housing and control means;

means for filtering electromagnetic interference from said AC supply and providing a filtered AC supply;

distribution means, remote from and electrically attached to said housing control means, for distributing said filtered AC supply and said auxiliary AC supply to plural pieces of user equipment according to said controlling;

relay means for selectively supplying said filtered AC supply and said auxiliary AC supply to said distribution means upon command;

means for switching said AC supply off and on;

means for indicating said switching means is on and said AC supply is received by said control means;

means for protecting said apparatus from power surges in said AC supply;

means for presetting adjustable upper and lower limits of a voltage window;

means for monitoring said filtered AC supply and sensing voltage dexiations of said filtered AC supply outside of said window, providing a deviation output signal in response to a sensed voltage deviation outside of said window, and actuating said relay means in response to said deviation output signal to disconnect said filtered AC supply from said distribution means and connect said auxiliary AC supply to said distribution means in response to said deviation output signal and to disconnect said auxiliary AC supply and reconnect said filtered AC supply to said distribution means upon cessation of said deviation output signal.

5. An improvement as in claim 4, and further comprising:

means for interlocking said control means and at least one piece of said user equipment and signalling said one piece of user equipment of the presence or absence of said deviation output signal, whereby data is transferred automatically between volatile and non-volatile memory as by an executive interrupt program.

6. An improvement as in claim 4, wherein said auxiliary AC supply is from a battery supplied inverter and said housing further comprises:

a battery charger connected to said AC supply and attachable to said battery;

means for indicating the attachment and detachment of said battery charger and battery;

contacts of said relay means for disconnecting said battery charger from said battery and connecting said indicating means to said battery by said relay means in response to said deviation output signal and for connecting said battery charger to said battery and disconnecting said indicating means from said battery upon cessation of said deviation output signal, whereby said auxiliary AC supply floats on said AC supply via said battery charger.

* * * * *